United States Patent
Racz et al.

(10) Patent No.: US 10,861,128 B2
(45) Date of Patent: Dec. 8, 2020

(54) METHOD OF CROPPING AN IMAGE, AN APPARATUS FOR CROPPING AN IMAGE, A PROGRAM AND A STORAGE MEDIUM

(71) Applicant: Canon Europe N.V., XB Amstelveen (NL)

(72) Inventors: Peter Racz, Szeged (HU); Alex Bársony, Szeged (HU); Adam Debreceni, Szeged (HU)

(73) Assignee: Canon Europa N.V., Amstelveen (NL)

( * ) Notice: Subject to any disclaimer, the term of this patent is extended or adjusted under 35 U.S.C. 154(b) by 16 days.

(21) Appl. No.: 15/725,135

(22) Filed: Oct. 4, 2017

(65) Prior Publication Data
US 2018/0096449 A1    Apr. 5, 2018

(30) Foreign Application Priority Data
Oct. 5, 2016  (EP) .................... 16192459

(51) Int. Cl.
| | |
|---|---|
| *G06T 3/00* | (2006.01) |
| *G06T 7/11* | (2017.01) |
| *G06K 9/00* | (2006.01) |
| *G06K 9/32* | (2006.01) |
| *G06T 7/73* | (2017.01) |
| *G06T 11/00* | (2006.01) |

(52) U.S. Cl.
CPC ........ *G06T 3/0012* (2013.01); *G06K 9/00228* (2013.01); *G06K 9/00234* (2013.01); *G06K 9/3233* (2013.01); *G06T 7/11* (2017.01); *G06T 7/73* (2017.01); *G06T 11/00* (2013.01); *G06T 2207/20132* (2013.01); *G06T 2207/30201* (2013.01); *G06T 2210/22* (2013.01); *G06T 2210/36* (2013.01)

(58) Field of Classification Search
None
See application file for complete search history.

(56) References Cited

U.S. PATENT DOCUMENTS

| | | | |
|---|---|---|---|
| 2014/0010416 A1* | 1/2014 | Tanaka | G06K 9/00228 382/118 |
| 2015/0003680 A1* | 1/2015 | Umeda | G06K 9/00228 382/103 |
| 2015/0161466 A1 | 6/2015 | Welinder | |
| 2015/0213612 A1* | 7/2015 | Lin | G06F 16/5838 382/173 |

FOREIGN PATENT DOCUMENTS

WO    2013062775 A1    5/2013

* cited by examiner

*Primary Examiner* — Yi Wang
(74) *Attorney, Agent, or Firm* — Canon U.S.A., Inc. IP Division (57) ABSTRACT

A method of cropping an image containing an image of a human face includes detecting a region occupied by the image of the human face within the image, evaluating a plurality of candidate crops of the image, and selecting a crop of the image from the plurality of candidate crops of the image based on the results of the evaluation. The evaluating step includes applying a penalty to a candidate crop of the image in which the detected region occupied by the image of the human face is excluded or only partially included.

20 Claims, 13 Drawing Sheets

METHOD OF CROPPING AN IMAGE, AN APPARATUS FOR CROPPING AN IMAGE, A PROGRAM AND A STORAGE MEDIUM

CROSS-REFERENCE TO RELATED APPLICATIONS

This application claims the benefit under 35 U.S.C. § 119(a)-(d) of European Patent Application No. 16192459.2, filed on Oct. 5, 2016 and entitled "A method of cropping an image, an apparatus for cropping an image, a program and a storage medium".

The above cited patent application is incorporated herein by reference in its entirety.

BACKGROUND OF THE INVENTION

There are many different types of electronic device that are capable of displaying a stored image. These devices include mobile phones, tablets, personal computers including a monitor, televisions etc. The aspect ratio of the displays on these devices vary significantly as do the aspect ratios of images that may be captured by digital cameras. For example, it is known to take photographs in the following aspect ratios 1:1 (square format), 4:3, 3:2 (35 mmm film), 5:3, 16:9 (HD TV), 3:1 (panoramic image). Additionally, if the image is cropped during editing in an image editing program nearly any aspect ratio is possible.

The desire to display images of various different aspect ratios on displays of different devices means that often the aspect ratio of the display will not match the aspect ratio of the image to be displayed. Further only a portion of the display may be allocated for display of the image and that portion of the display may have any aspect ratio. When displaying an image whose aspect ratio is different from that of the display or the area of the display allocated to display of the image, it is known to reduce the size of the image to fit the whole image in the available display area. This leaves bands on one or both sides of the image which allow for the difference in aspect ratio.

It is also known to crop the image to fill the area of the display or area of the display allocated to display of the image. This has the advantage of avoiding the bands on one or both sides of the image, but has the disadvantage that some of the image is cropped/missing.

When cropping an image to fill a display area, prior art methods may cause unfortunate effects in the photograph. One example of this is the possibility of cropping out part of a person's face. For example, in a family or group photo in which there are many faces extending across an image, there is a chance that the edge of the image, once cropped to fit the display, will fall across one of the faces creating an unsatisfactory visual effect.

BRIEF SUMMARY OF THE INVENTION

An aim of the present invention is to provide a method of cropping an image that reduces the occurrence of crops of the image in which a person's face is excluded or only partially included in the cropped image.

According to a first aspect of the present invention there is provided a method of cropping an image containing an image of a human face comprising: detecting a region occupied by the image of the human face within the image; evaluating a plurality of candidate crops of the image; and selecting a crop of the image from the plurality of candidate crops of the image based on the results of the evaluation, wherein the evaluating step includes applying a penalty to a candidate crop of the image in which the detected region occupied by the image of the human face is excluded or only partially included.

In some embodiments evaluating step comprises calculating a basic score and applying the penalty to the basic score. The basic score may be calculated based on at least one of a measure of luminance, a measure of entropy, and a measure of sharpness.

In some embodiments if the image contains a plurality of images of human faces, the method comprises applying a penalty for each face that is excluded or only partially included in the candidate crop of the image. Further, the method may include applying a penalty function for every face in the image. In such embodiments, the penalty reduces the likelihood that the candidate crop will be selected as the crop of the image.

In some embodiments, the penalty applied for each image is weighted in accordance with a feature of the region of the image face in respect of which the penalty is being applied. In some such embodiments, the feature of the region of the image of the face is at least one of a measure of the sharpness of the image of the face, the luminance of the image of the face, and a size of the image of the face.

According to a second aspect of the present invention there is provided an apparatus for cropping an image containing an image of a human face comprising: detecting means for detecting a region occupied by the image of the human face within the image; evaluating means for evaluating a plurality of candidate crops of the image; and selecting means for selecting a crop of the image from the plurality of candidate crops of the image based on the results of the evaluation, wherein the evaluating means is configured to apply a penalty to a candidate crop of the image in which the detected region occupied by the image of the human face is excluded or only partially included.

According to a third aspect of the present invention there is provided a program that, when executed by a computer, causes the computer to perform the method of the first aspect of the invention.

According to a fourth aspect of the present invention there is provided a storage medium storing a program according to the third aspect of the present invention.

BRIEF DESCRIPTION OF THE DRAWINGS

Embodiments of the present invention will now be described, by way of example only, with reference to the accompanying figures in which.

DETAILED DESCRIPTION OF THE EMBODIMENTS

Figure 1:
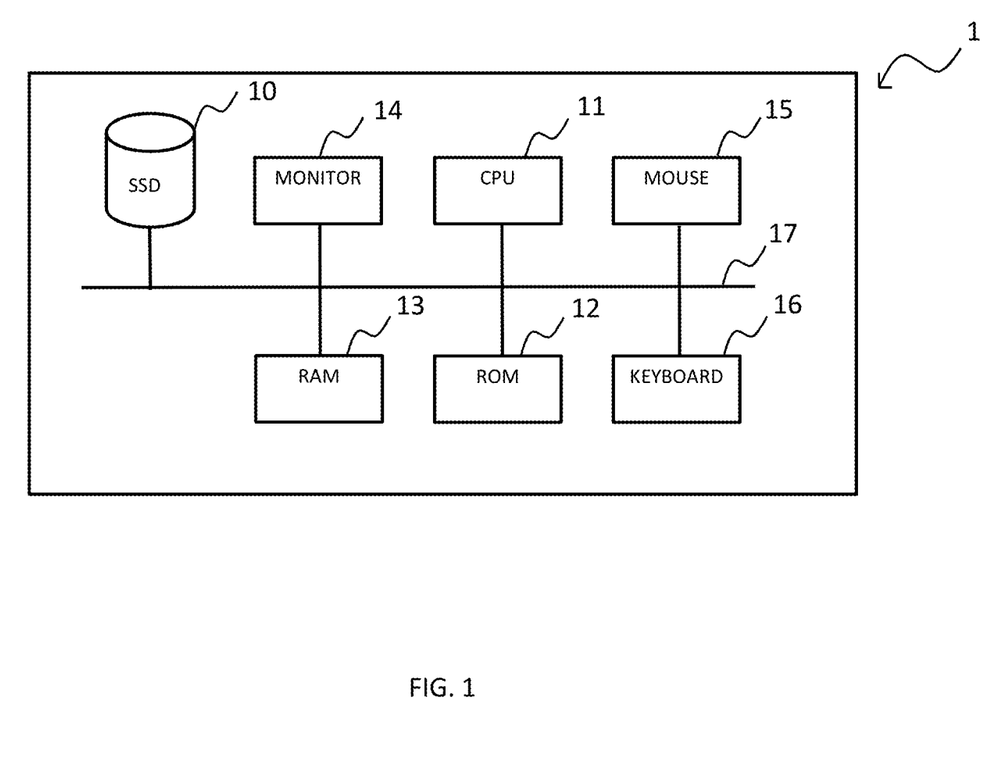
FIG. 1 shows a computer.

FIG. 1 shows architecture of a computer of the first embodiment. The computer could be a personal computer, a mobile phone, a tablet or any other type of computer with a display. In the first embodiment the computer is a PC 1. The PC 1 includes a solid state drive 10, a CPU 11, ROM 12, and RAM 13. The PC 1 further includes a monitor 14, a mouse 15, and a keyboard 16. The components of the PC 1 are connected by an internal bus 17.

The first embodiment is concerned with cropping an image stored in the SSD 10 for display on a portion of the monitor 14. The steps of the method are carried out by a computer program running on the PC 1. For the purposes of the first embodiment, the program is an image browser. However, many types of program can be used to display images including web browsers, image editing programs, etc.

Figure 2:
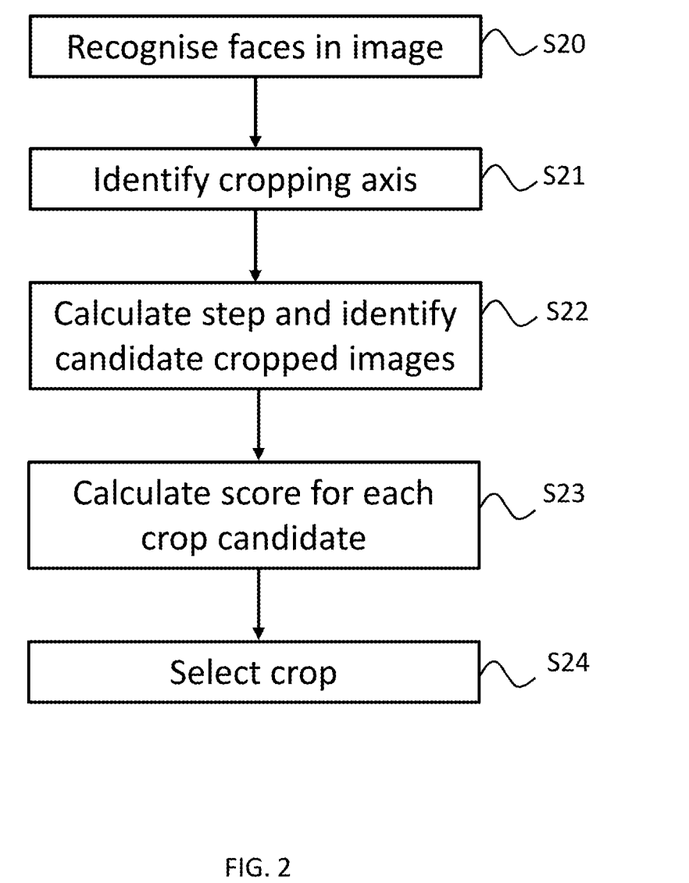
FIG. 2 is a flow chart showing steps of a method according to a first embodiment of the present invention.

The steps of the first embodiment are described with reference to the flowchart shown in FIG. 2. In the first embodiment, the image is a rectangular to be displayed on a display area of the monitor 14 which display area has rectangular dimensions. If the aspect ratios of the image and the display area are the same, no problem arises and the image may simply be displayed by rescaling the image as appropriate to meet the display resolution of the monitor 14. However, the invention is concerned with the case that the aspect ratios are different. In such a case, in step S20 the image is analysed to identify whether there are any faces in the image and identify areas of the image occupied by the face or faces. The field of face detection is well established and there are many possible approaches that could be adopted. One suitable method is described in ref 1, 'Histograms of oriented gradients for human detection' CVPR 2005 by Navneet Dalal and Bill Triggs published by the computer vision foundation. Another approach is described in ref 2, 'Fast Multi-view Face detection' by M Jones and P Viola, TR2003-96 August 2003. It is noted that both methods use a sliding window approach to face detection. A further approach is described in ref 3, 'Rapid Object Detection using a Boosted Cascade of Simple Features' by Paul Viola and Michael Jones, Conference on Computer Vision and Pattern Recognition 2001. This method is conveniently implemented in the object detection module of OpenCV 3.0.0. In each method, a window that is determined to include a human face provides a region of the image in which a face is determined to be present (see FIG. 1 of ref 1, FIGS. 5 and 8 of ref 2, and FIG. 7 of ref 3).

In step S21, the aspect ratio of the image to be displayed is compared with the aspect ratio of the display area in order to determine a cropping axis. The ratio of the pixel count of image in the horizontal direction, $x_i$, to the pixel count of the image in the vertical direction, $y_i$, is compared with the ratio of the pixel resolution of the monitor 14 in the horizontal direction, $x_m$, to the pixel resolution of the monitor 14 in the vertical direction, $y_m$. The possible results are as follows:

$$\frac{x_i}{y_i} > \frac{x_m}{y_m}$$

Cropping required along horizontal, x, axis of image $$\frac{x_i}{y_i} = \frac{x_m}{y_m}$$

No cropping required $$\frac{x_i}{y_i} < \frac{x_m}{y_m}$$

Cropping required along vertical, y, axis of image

Figure 4:
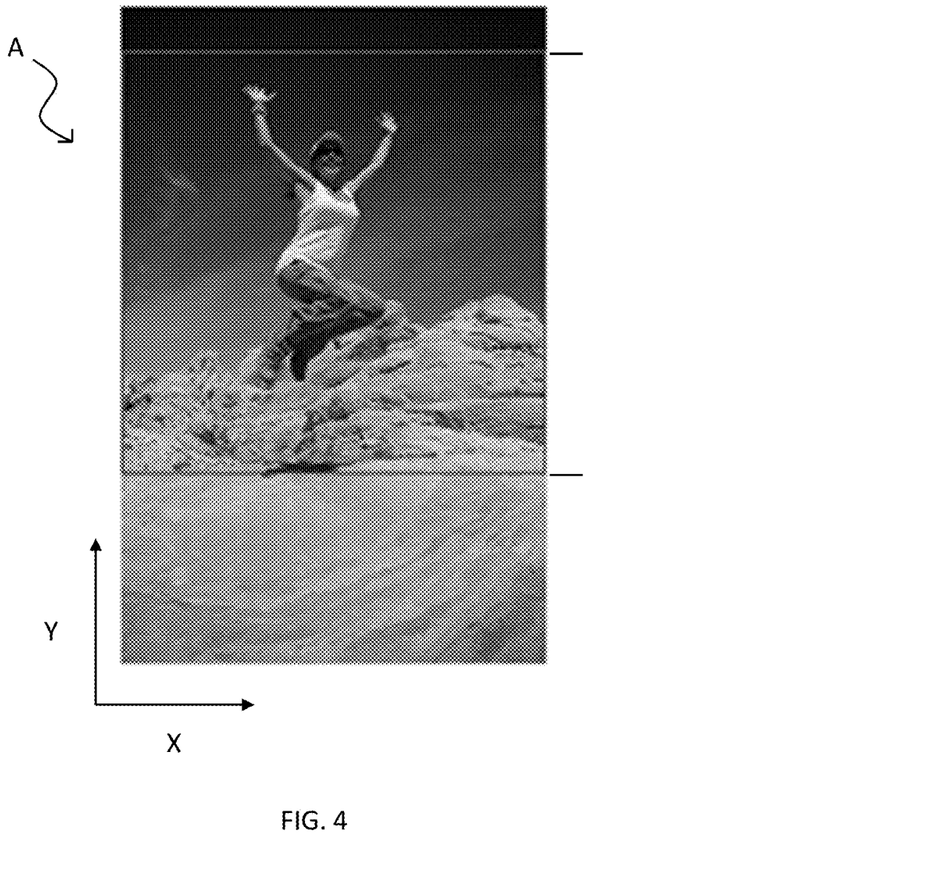
FIG. 4 shows an image that is used as an example in the method of the first embodiment.

FIG. 4 shows an example of an image to be cropped. The display area A is shown in FIG. 4 and has an aspect ratio that is larger than the aspect ratio of the image. Accordingly, the image is to be cropped along the vertical axis (Y axis). The image is scaled to fit the horizontal size of the display area on the monitor so that only cropping in a single dimension is required. The candidate crops may be found by moving the cropping window along the identified cropping axis.

In step S22, a step size calculation may optionally be performed. As can be seen from FIG. 4, there are many possible crops along the vertical axis. A first candidate crop is a crop in which the top of the candidate crop coincides with the top of the image. Further candidate crops can be found by incrementally moving the cropping area down the image (along the cropping axis) until the bottom of the candidate crop coincides with the bottom of the image. In the first embodiment, the candidate crops will be considered at increments of 1 pixel as the cropping window is moved down the image. However, in other embodiments another step value may be used or a particular number of crops could be considered in order to control the amount of processing required to select a candidate cropped image. For example, if it were desired to consider ten candidate crops and select the best, the difference along the vertical axis between the length of the scaled image and the length of the display area could be divided by 9 in order to generate a step value. The first candidate image in this case would be at step value 0 with the top of the cropped image coinciding with the top of the image and the other 9 candidates would be generated by incrementally moving the cropping window down the image by the step values until the last candidate cropped image has a lower edge that coincides with the bottom of the image.

Figure 3:
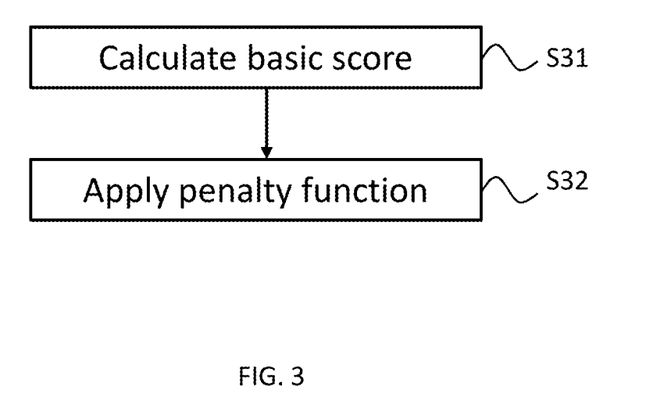
FIG. 3 is a flow chart showing more detail of calculation of a score for possible crops of an image.

In step S23 for each candidate crop a score is calculated. Step S23 is explained in more detail in FIG. 3. The score calculation S23 comprises the steps of calculating a basic score S31 and applying a penalty function S32. The step of calculating a basic score is done by use of three metrics: luminance, sharpness and entropy.

For images in the R, G, B color space, the luminance of a pixel is calculated as follows:

$$Y = 0.2126R + 0.7152G + 0.0722B$$

So for an image with 8 bits per color channel, the luminance of a pixel Y can take a value between 0 and 255. The value of the luminance is averaged across the candidate cropped image and then normalized by dividing by 255. This results in a normalized value of luminance for the candidate cropped image, L, which will be referred to below.

Determining the sharpness of the candidate cropped images is more difficult, as there is no standard measure of sharpness. Many approaches are possible, but in the first possible measure of sharpness is measured using the FISH algorithm described in 'A fast wavelet-based algorithm for global and local image sharpness estimation' by P Vu and D Chandler IEEE signal processing letters, 2012. The sharpness is calculated for each of the candidate cropped images using the FISH algorithm and then normalized based on the resulting values so that the sharpness, S, of the candidate cropped images can vary between 0 and 1. A second option, used in the first embodiment, is to use variance of the Laplacian as described in 'Diatom autofocusing in brightfield microscopy: a comparative study' by Pech-Pacheco et al 2000 ICPR.

The entropy for each candidate cropped image is determined by using the Shannon entropy. There are various known algorithms for calculating the Shannon entropy of an image, such as the entropy function in MatLab, that will return the entropy of a grayscale image. The entropy of the cropped images is normalized, E, so as to vary between 0 and 1.

The basic scores are then calculated based on the following formulae:

$$score = \alpha_L * L + 0.5 * \alpha_E * E + \alpha_S * S \text{ if } S < \beta$$

$$score = \alpha_L * L + \alpha_E * E + \alpha_S * S \text{ if } S \geq \beta$$

The value $\beta$ is a value set for determining whether an image is blurry or not. The value may be set by trial and error by applying the sharpness algorithm to various blurry and sharp images and selecting a suitable value. The first formula is used if the candidate cropped image is considered to be relatively blurry ($S < \beta$). This formula halves the value of the entropy imposing a relative penalty on cropped images that are relatively blurry because the crop is less likely to include the relevant part of the image that was in focus and of interest to the user. The second formula is used if $S \geq \beta$. The values $\alpha_L$, $\alpha_E$, $\alpha_S$ are weight values that may be set according to requirements depending on the image sets being considered.

Figure 5:
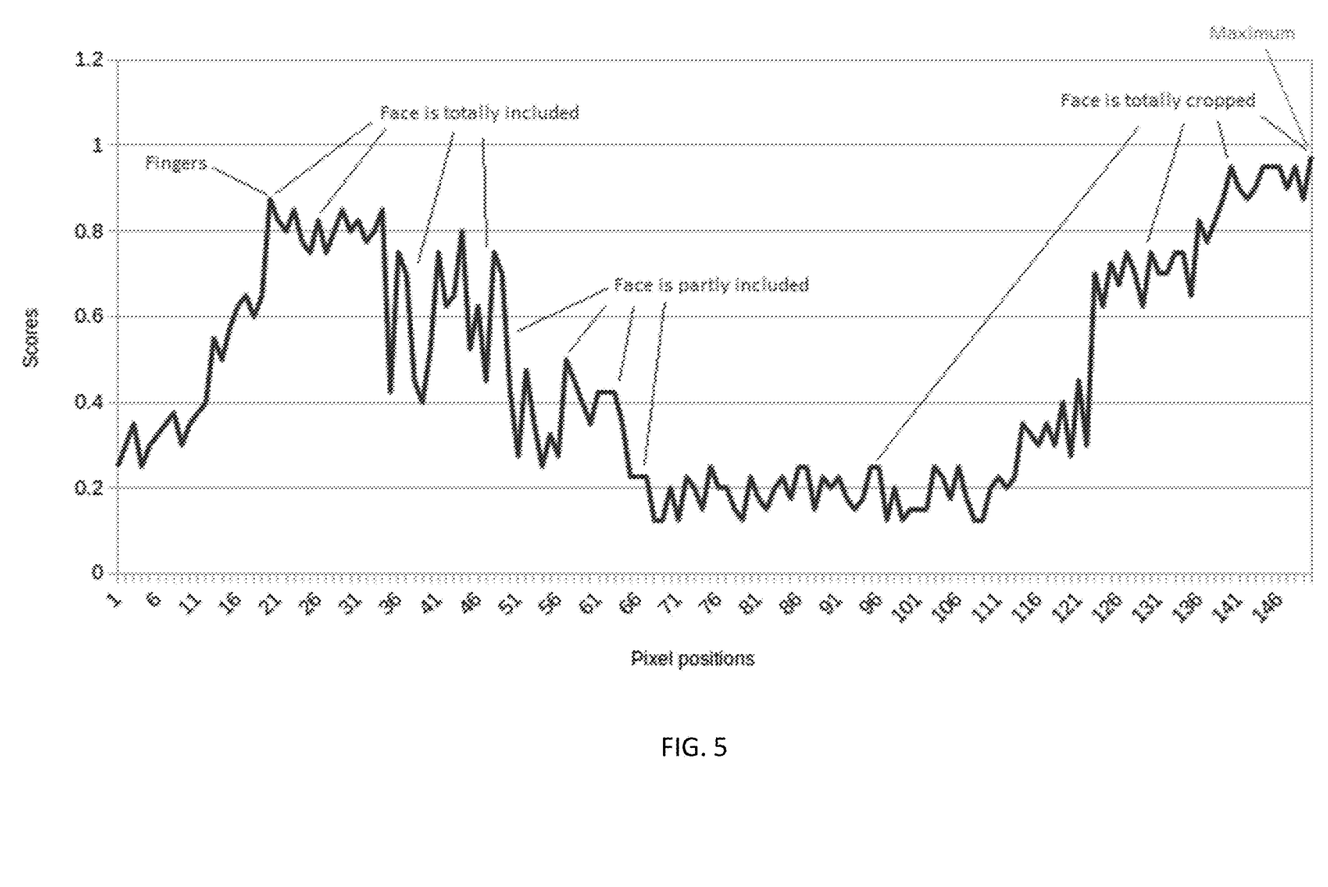
FIG. 5 shows basic score values for a plurality of possible crops of the image shown in FIG. 4.

FIG. 5 shows the results of evaluating the basic score for candidate crops at a step of every pixel in connection with the image shown in FIG. 4. It can be seen that the maximum value occurs when the face is fully cropped out of the image such that the bottom edge of the cropped image corresponds to the bottom edge of the original image. This, of course, is not the most satisfactory candidate crop from a user's point of view as the lady's face is cropped from the image.

Figure 6:
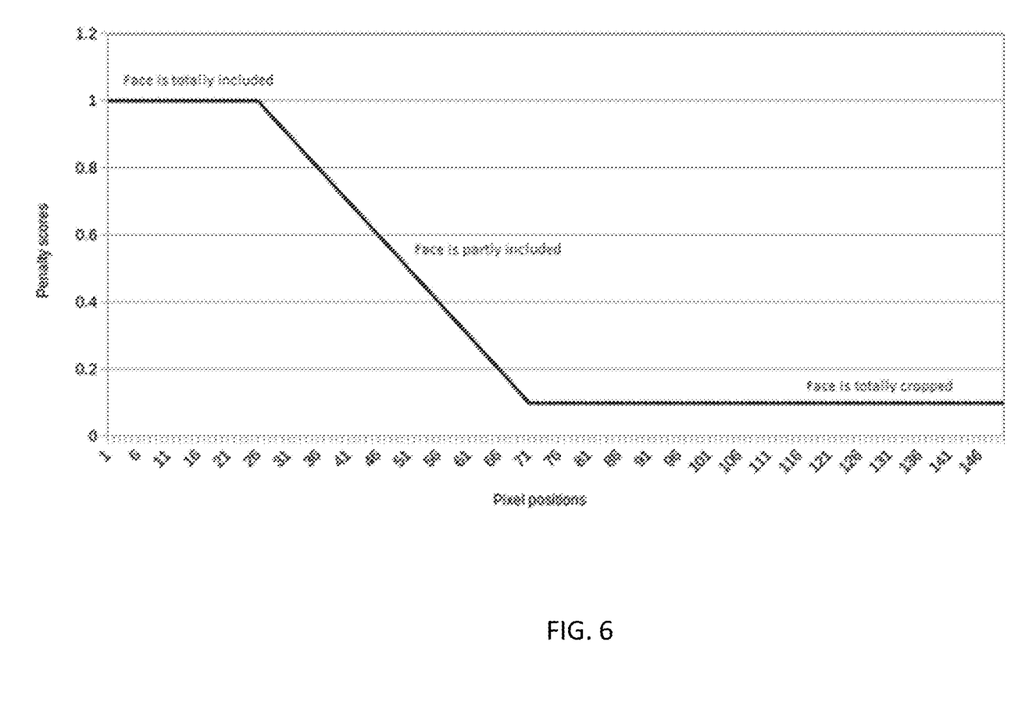
FIG. 6 shows a penalty function used to calculate score values.

In step S32 a penalty function is applied. The penalty function is shown in FIG. 6 and the score values shown in FIG. 5 are multiplied by the corresponding values of the penalty function to generate the final score values output in step S23. In the first embodiment there is only a single face and it can be seen that the penalty function takes a value of 1 (no penalty) when the face is included in the candidate cropped image falling to 0.1 when the face is totally cropped in the candidate cropped image. Thus, the penalty function imposes a penalty on images that do not include the face region detected in step S20.

Figure 7:
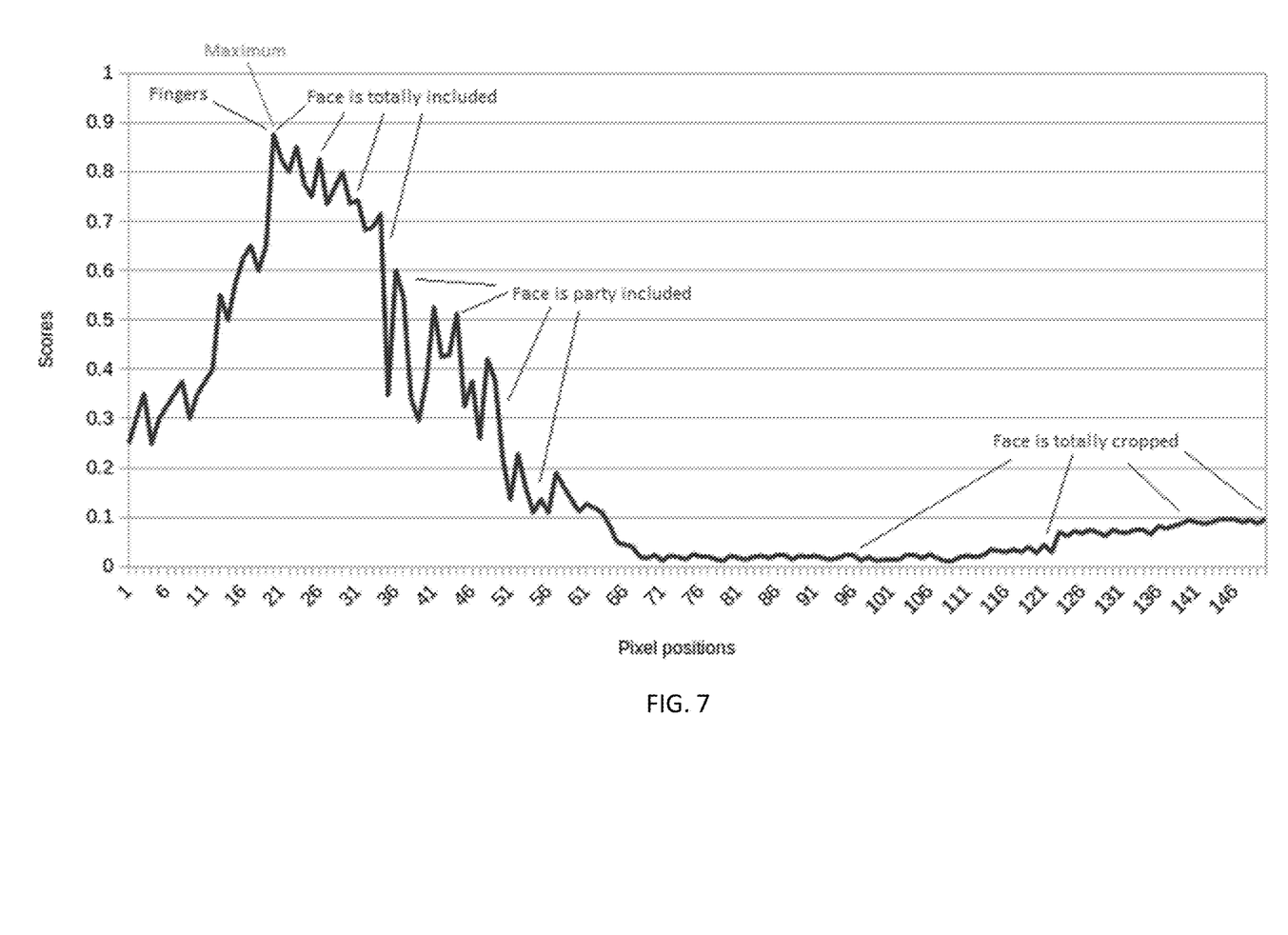
FIG. 7 shows score values of possible crops of the image shown in FIG. 4 after application of the penalty function shown in FIG. 6

The scores after application of (multiplication by) the penalty function are shown in FIG. 7.

In step S24 the candidate cropped image with the highest score value is selected as the cropped image. Looking at FIG. 7, it can be seen that for the example image shown in FIG. 4 the candidate cropped image displaced 21 pixels from the top of the original image will be selected as the cropped image. This corresponds to the crop shown in FIG. 4 which includes the lady's face.

The image is cropped according to the selected candidate cropped image and the cropped image is then displayed in the display area on the monitor 14.

Embodiment 2

The first embodiment dealt with an image that included only a single face. In the second embodiment, an example will be considered in which a plurality of faces is present in the image.

Figure 8:
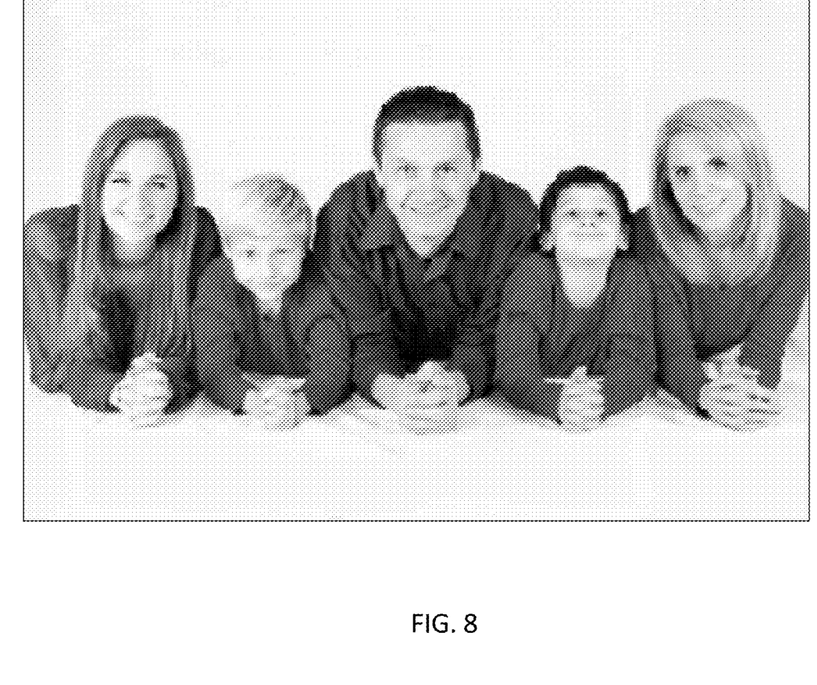
FIG. 8 shows an image that is used as an example in the method of the second embodiment.
Figure 9:
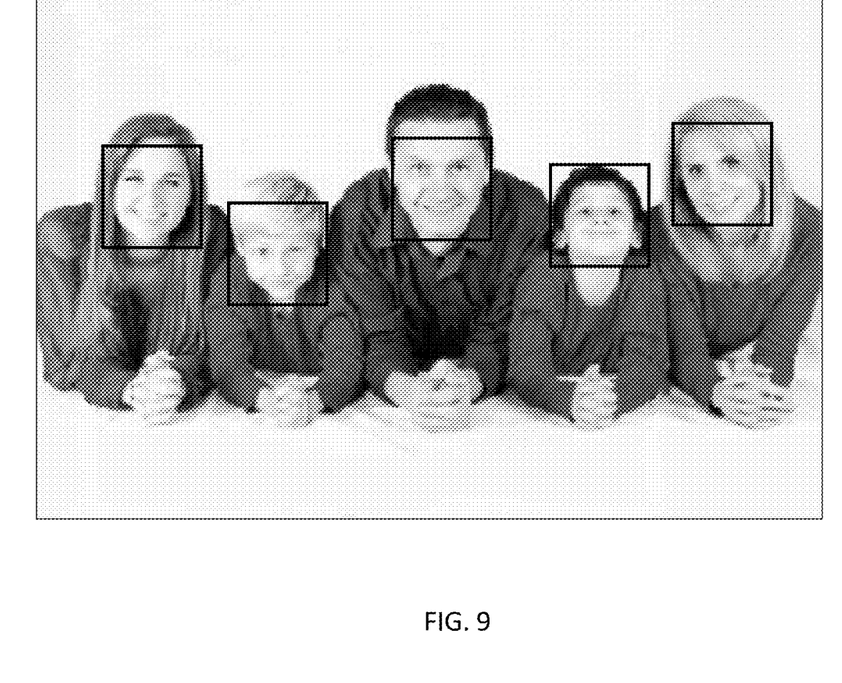
FIG. 9 shows the image shown in FIG. 8 after face detection.

The method of the second embodiment follows the steps of the first embodiment described above with respect to FIG. 2 with a modification to the step S23 relating to calculation of the score for each crop candidate. FIG. 8 shows an example image for the second embodiment. FIG. 9 shows the result of step S20 on the example image, in which the faces in the image have been identified and regions of the image containing the faces are identified.

Figure 10:
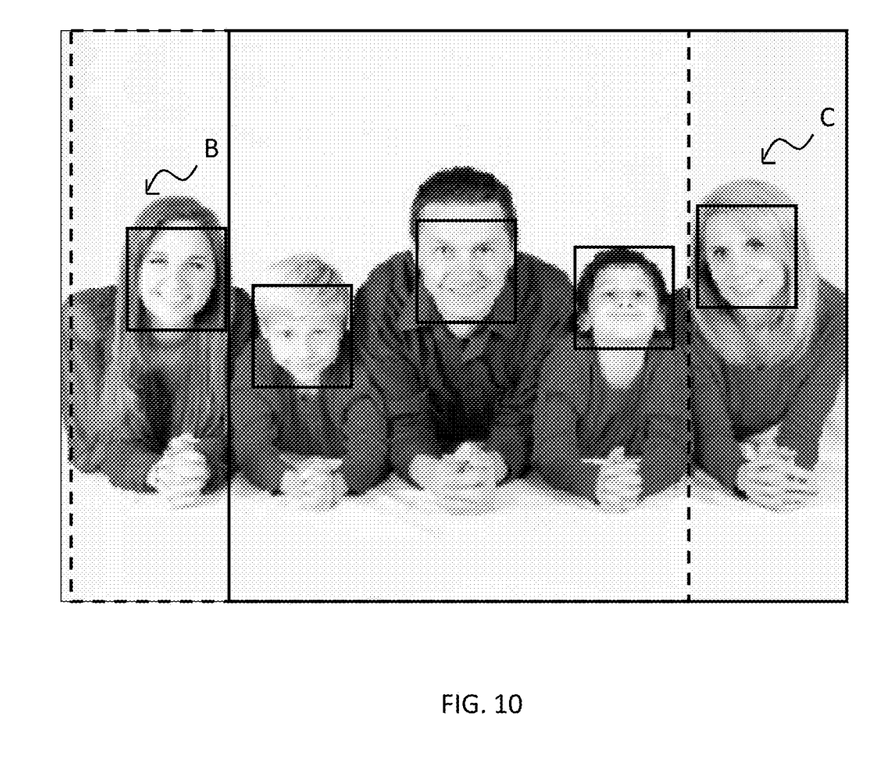
FIG. 10 shows two possible crops of the image shown in FIG. 9.

The problem solved by the second embodiment is illustrated in FIG. 10 which shows two possible crops of the image. The first is shown by a continuous black box and the other is shown by the dashed black box. The boxes correspond to the display area on the monitor 14 in which the image is to be displayed. It is not possible to include all five faces in the cropped image, so the cropping method needs to allow a decision to be made as to which face should be cropped from the image. Preferably, but not essentially, the crop should also avoid splitting faces.

The basic score is calculated at S31 in the same way as the first embodiment. However, the application of the penalty function in S32 differs from the first embodiment as follows.

The combined penalty function to be applied is calculated as a linear sum of individual penalty functions for each of the faces detected in the image. The individual penalty functions follow the same form illustrated in the first embodiment: if the face is completely included the function has a value of 1, if the face is completely excluded the function has a value of 0.1 and the function falls linearly depending on the amount of the face that is partially excluded. The two children and male included in the image are relatively central in the image and are not partially or completely excluded in any of the candidate crops. Accordingly, the value of their penalty functions would be 1 for all candidate crops, which is to say that they make no adjustment to the basic score. Accordingly, the following description will focus on the ladies at the right and left sides of the images who are excluded from the image in one or more candidate cropped images. However, it is to be understood that all the faces in the image are considered, but only those that are completely or partially excluded in the candidate crops will contribute to the combined penalty function applied to the basic score.

Figure 11:
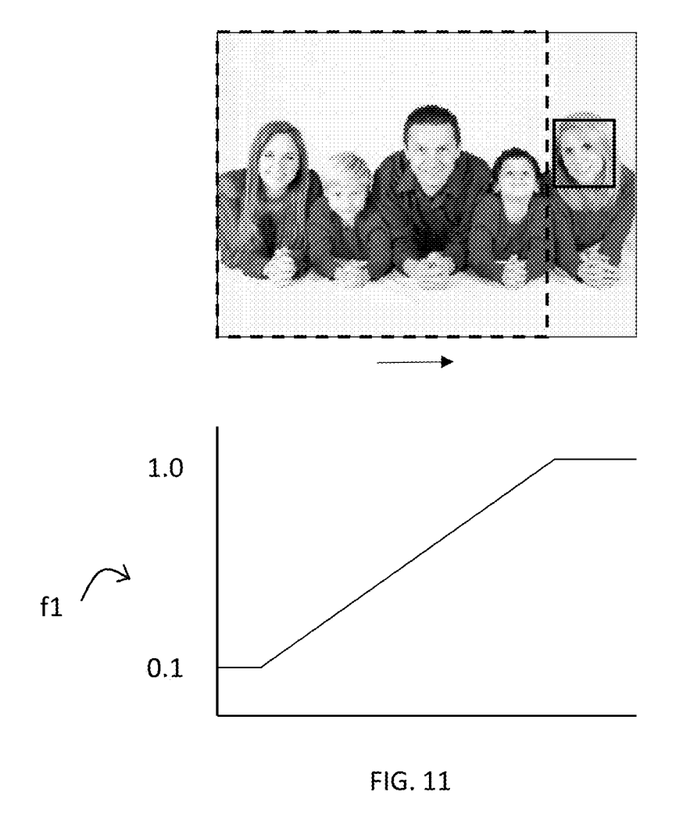
FIG. 11 shows a penalty function associated with a first face included in the image of FIG. 8.
Figure 12:
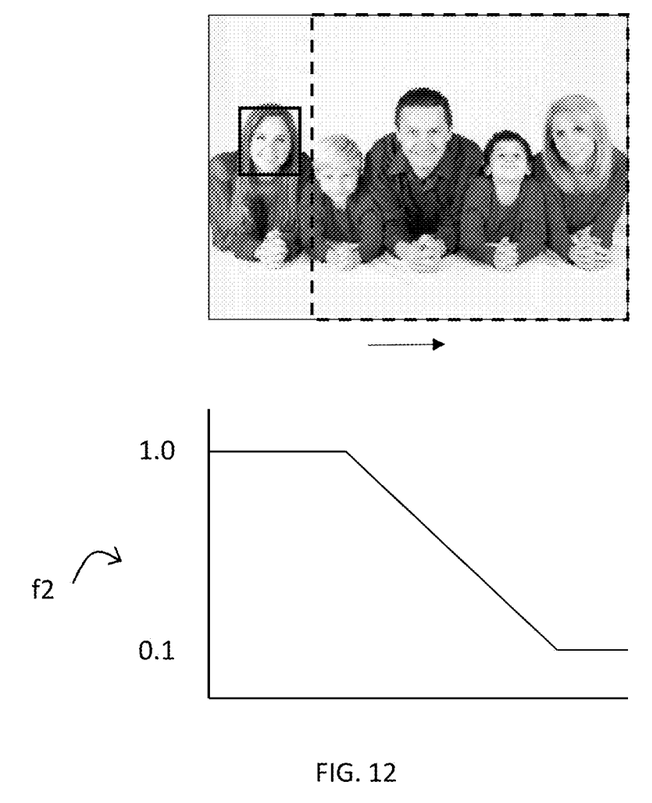
FIG. 12 shows a penalty function associated with a second face included in the image of FIG. 8.

The penalty function can be understood by considering the individual penalty functions for each of the lady on the right-hand side of FIG. 10, f1, which is illustrated in FIG. 11, and the lady on the left-hand side of FIG. 10, f2, which is illustrated in FIG. 12.

The linear sum that makes up the combined penalty function is calculated as follows:

$$\text{penalty function} = \gamma f1 + \delta f2$$

Where f1 and f2 are as described above and illustrated in FIGS. 11 and 12. The weights $\gamma$ and $\delta$ are determined as follows. The regions of the image containing each of the faces (the boxes B and C shown in FIG. 10) are analysed to determine normalized luminance and sharpness using the methods previously described for examining the candidate crops. If the normalized luminance of the face region of the lady on the right-hand side is $l_1$ and the normalized sharpness is $S_1$ and the luminance of the face region of the lady on the left-hand side is $l_2$ and sharpness is $S_2$ then the weight factors are:

$$\gamma = \frac{S_1 + l_1}{S_1 + l_1 + S_2 + l_2}$$
$$\partial = \frac{S_2 + l_2}{S_1 + l_1 + S_2 + l_2}$$

Figure 13:
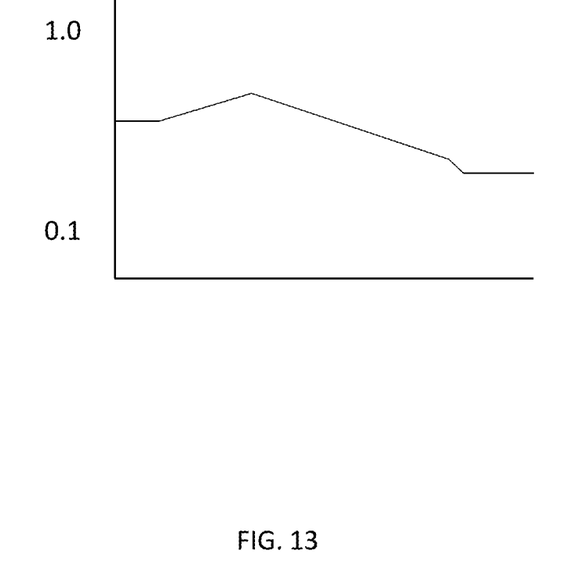
FIG. 13 shows a penalty function that results from the penalty functions illustrated in FIGS. 11 and 12.

In the example shown in FIG. 8, the lady on the left is determined to be brighter/sharper and $\delta > \gamma$. The resulting penalty function is shown in FIG. 13.

The rest of the method is the same as the first embodiment. The basic scores are multiplied by the combined penalty function shown in FIG. 13 and the crop with the highest score is selected as the cropped image for display in the display portion on the monitor.

The second embodiment has been described with luminance and sharpness as the two factors used to generate weighting factors $\delta$ and $\gamma$. However, in another embodiment, size of the region of the face within the image may be used as a factor. When using the method described in ref. 3 or otherwise, the sliding window may be applied to the image at different scales (i.e. different sized windows). This will result in multiple detections of a face in different overlapping windows. The set of windows that detect a particular face can be combined to obtain a single detection of a face and the corners of the bounding region can be, for example, the average of the corners of the windows of all the windows within that set. The size of the bounding region can then be used to generate the weighting factors so that the penalty function more heavily penalizes excluding larger face regions from the image than smaller face regions.

Embodiments of the present invention have been described above. Further embodiments of the present invention can also be realized by apparatuses or systems that read out and execute programs recorded on a memory device to perform the functions of the above-described embodiment(s), and by a method, the steps of which are performed by, for example, reading out and executing a program recorded on a memory device to perform the functions of the above-described embodiment(s). For this purpose, the program may be provided to the image processing apparatus or image processing system, for example via a network or from a recording medium of various types serving as the memory device (e.g., computer-readable medium).

The invention claimed is:

1. A method of cropping an original image containing an image of a human face comprising:
   detecting a region occupied by the image of the human face within the original image;
   evaluating a plurality of candidate cropped images generated from the original image;
   by:
   calculating, for each candidate cropped image of the plurality of cropped images, a basic score based on a measure of luminance, a measure of entropy, and a measure of sharpness averaged across the candidate cropped image;
   multiplying, for each candidate cropped image of the plurality of cropped images, the basic score by a corresponding value of a penalty function to generate a final score value,
   wherein the penalty function imposes a penalty to a candidate cropped image in which the detected region occupied by the image of the human face is excluded or only partially included; and
   selecting a single candidate cropped image as a cropped image from the plurality of candidate cropped images based on the corresponding final score values.

2. The method according to claim 1 wherein if the image contains a plurality of images of human faces, the method comprises applying a penalty for each face that is excluded or only partially included in the candidate cropped image.

3. The method according to claim 2, wherein the penalty applied for each candidate cropped image is weighted in accordance with a feature of the region of the image face in respect of which the penalty is being applied.

4. The method according to claim 1 wherein applying a penalty comprises applying a penalty function for every face in the candidate cropped image.

5. The method according to claim 1 wherein the penalty reduces the likelihood that the candidate cropped image will be selected as the cropped image.

6. A non-transitory computer-readable storage medium storing a program that, when executed by a computer, causes the computer to perform the steps of the method of claim 1.

7. The non-transitory computer-readable storage medium according to claim 6 wherein if the image contains a plurality of images of human faces, the method comprises applying a penalty for each face that is excluded or only partially included in the candidate cropped image.

8. The non-transitory computer-readable storage medium according to claim 7, wherein the penalty applied for each candidate cropped image is weighted in accordance with a feature of the region of the image face in respect of which the penalty is being applied.

9. The non-transitory computer-readable storage medium according to claim 6 wherein applying a penalty comprises applying a penalty function for every face in the candidate cropped image.

10. The non-transitory computer-readable storage medium according to claim 6 wherein the penalty reduces the likelihood that the candidate cropped image will be selected as the cropped image.

11. An apparatus for cropping an original image containing an image of a human face comprising:
   detecting means for detecting a region occupied by the image of the human face within the original image;
   evaluating means for evaluating a plurality of candidate cropped images generated from the original image;
   by:
   calculating, for each candidate cropped image of the plurality of cropped images, a basic score based on a measure of luminance, a measure of entropy, and a measure of sharpness averaged across the candidate cropped image;
   multiplying, for each candidate cropped image of the plurality of cropped images, the basic score by a corresponding value of a penalty function to generate a final score value,
   wherein the penalty function imposes a penalty to a candidate cropped image in which the detected region occupied by the image of the human face is excluded or only partially included; and selecting a single candidate cropped image as a cropped image from the plurality of candidate cropped images based on the corresponding final score values.

12. The apparatus according to claim 11 wherein if the image contains a plurality of images of human faces, the apparatus further comprises an applying means for applying a penalty for each face that is excluded or only partially included in the candidate cropped image.

13. The apparatus according to claim 12, wherein the penalty applied for each candidate cropped image is weighted in accordance with a feature of the region of the image face in respect of which the penalty is being applied.

14. The apparatus according to claim 11 wherein applying a penalty comprises applying a penalty function for every face in the candidate cropped image.

15. The apparatus according to claim 11 wherein the penalty reduces the likelihood that the candidate cropped image will be selected as the cropped image.

16. An apparatus for cropping an original image containing an image of a human face comprising:
    a processor;
    a memory;
    a code portion adapted to detect a region occupied by the image of the human face within the original image;
    a code portion adapted to evaluate a plurality of candidate cropped images generated from the original image;
    by:
    calculating, for each candidate cropped image of the plurality of cropped images, a basic score based on a measure of luminance, a measure of entropy, and a measure of sharpness averaged across the candidate cropped image;
    multiplying, for each candidate cropped image of the plurality of cropped images, the basic score by a corresponding value of a penalty function to generate a final score value;
    wherein the penalty function imposes a penalty to a candidate cropped image in which the detected region occupied by the image of the human face if excluded or only partially included; and
    selecting a single candidate cropped image as a cropped image from the plurality of candidate cropped images based on the corresponding final score values.

17. The apparatus according to claim 16 wherein if the image contains a plurality of images of human faces, the apparatus further comprises an applying means for applying a penalty for each face that is excluded or only partially included in the candidate cropped image.

18. The apparatus according to claim 17, wherein the penalty applied for each candidate cropped image is weighted in accordance with a feature of the region of the image face in respect of which the penalty is being applied.

19. The apparatus according to claim 16 wherein applying a penalty comprises applying a penalty function for every face in the candidate cropped image.

20. The apparatus according to claim 16 wherein the penalty reduces the likelihood that the candidate cropped image will be selected as the cropped image.

* * * * *